(12) United States Patent
Peeters et al.

(10) Patent No.: US 7,665,715 B2
(45) Date of Patent: Feb. 23, 2010

(54) MICROVALVE

(75) Inventors: Eric Peeters, Fremont, CA (US); Ashish Pattekar, Cupertino, CA (US); Gregory B. Anderson, Woodside, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 448 days.

(21) Appl. No.: 11/644,352

(22) Filed: Dec. 22, 2006

(65) Prior Publication Data

US 2008/0149183 A1 Jun. 26, 2008

(51) Int. Cl.
*F16K 31/02* (2006.01)

(52) U.S. Cl. .................. 251/129.06; 251/4; 251/129.01

(58) Field of Classification Search ...................... 251/4, 251/11, 129.01, 129.06
See application file for complete search history.

(56) References Cited

U.S. PATENT DOCUMENTS

| | | | | |
|---|---|---|---|---|
| 5,346,372 A | * | 9/1994 | Naruse et al. ............... | 417/379 |
| 5,610,795 A | * | 3/1997 | Snelling .................... | 361/225 |
| 5,645,888 A | | 7/1997 | Titterington et al. | |
| 5,977,685 A | * | 11/1999 | Kurita et al. ............... | 310/311 |
| 5,981,024 A | | 11/1999 | Noergaard et al. | |
| 6,234,079 B1 | | 5/2001 | Chertkow | |
| 6,645,403 B1 | | 11/2003 | Park et al. | |
| 6,685,442 B2 | * | 2/2004 | Chinn et al. ................ | 417/321 |
| 2004/0129158 A1 | | 7/2004 | Figov et al. | |
| 2006/0141762 A1 | | 6/2006 | Khandekar et al. | |
| 2007/0076084 A1 | | 4/2007 | Iftime et al. | |

FOREIGN PATENT DOCUMENTS

| | | |
|---|---|---|
| DE | 102005012801 | 9/2006 |
| EP | 1798030 A | 6/2007 |
| EP | 1935638 A | 6/2008 |
| WO | WO 02/051639 A2 | 7/2002 |

OTHER PUBLICATIONS

Kipphan, Helmut: Letterpress Printing, Handbook of Print Media, Spring 2001, pp. 395-400.

* cited by examiner

*Primary Examiner*—John K Fristoe, Jr.
(74) *Attorney, Agent, or Firm*—Bever, Hoffman & Harms, LLP; Patrick T. Bever

(57) ABSTRACT

An improved microvalve is described. The microvalve is formed such that the walls of the microvalve are formed from a gel material. Typically, the microvalve includes open flow paths, often holes, through a gel layer. An electric field is applied in regions where fluid flow is undesirable. The electric field compresses the gel closing the flow path thereby preventing further fluid flow.

13 Claims, 8 Drawing Sheets

MICROVALVE

CROSS-REFERENCE TO RELATED APPLICATIONS

This application is related to U.S. patent application Ser. No. 11/644,067, filed Dec. 22, 2006, entitled "An Improved Method Of Forming A Reconfigurable Relief Surface Using Microvalves;" and U.S. patent application Ser. No. 11/644,058, filed Dec. 22, 2006, entitled "An Improved Method Of Forming A Reconfigurable Relief Surface Using An Electrorheological Fluid," filed by the same inventors and filed on the same day. The contents of the related U.S. Patent Applications are hereby incorporated by reference in their entirety.

BACKGROUND

Flexography is a rotary contact relief printing method that utilizes a relief master plate made of a flexible rubber like material as an imaging source. Flexographic printing offers several advantages over other printing techniques including good substrate latitude due to the soft master plate, very high speed, (often 100's of feet of printed matter per minute) and good quality when used with viscous pigment based inks. Flexography is widely used for printing packaging materials and continues to gain market share in the printing market.

Gravure (intaglio) printing is a recess printing method where the printing surface such as a printing plate has recessed regions such as wells. The surface receives ink and a blade removes any excess ink, so that only the wells retain ink. A high applied contact pressure presses the printing surface against a substrate to be printed transferring the ink in the wells to the printing substrate. Typical printing substrates include paper, transparency, foils, plastics, etc. However, due to the high contact pressure, generally, gravure printing processes print to paper or relatively sturdy substrates.

Despite their speed and high quality, flexography and gravure have not been used for low volume printing because patterning the traditional master plate is a slow and expensive process that can take hours for a single plate. As a result, master plates are expensive. Once imaged, the master plate cannot be easily re-imaged or re-used. Thus, unless a long run of identical copies is needed, the cost of manufacturing a master plate cannot be justified.

Various techniques have been attempted to circumvent this problem. In U.S. Pat. No. 6,234,079 by R. Chertkow, a re-usable print plate is proposed using various techniques including electrostatic, shape memory alloys, electromagnetic and other contact means to adjust the print surface. However, most of the techniques are difficult to implement. For example, generating magnetic fields sufficient for actuation using coils involves high currents. Furthermore, the coils are difficult to fabricate. Patent application WO 2002051639 entitled Digital Printing Device and Method by S. Kaplan proposes a re-usable print plate using local heating of liquids that expand or vaporize under a membrane to create a relief printing surface. However, fabricating a printing plate with an array of heater elements corresponding to print pixel locations, each heater element to expand or vaporize liquids as proposed by Kaplan is expensive. Alternative approaches for localized heating of liquid near each pixel such as using high power laser sources are also expensive and this limits the market size for such a device.

Thus, an improved method of forming and actuating a printing plate for use in digital recess or relief printing is needed.

SUMMARY

A method of using a microvalve is described. The method includes pushing a fluid through a flow path, the flow path having walls made from a gel material. Applying a voltage between a first opening and a second opening in the flow path, the voltage producing a compressive force to the gel material that reduces the distance between the first opening and the second opening. The compressive force causing bowing of the flow path walls thereby closing the flow path and preventing fluid flow through the flow path.

DETAILED DESCRIPTION

Figure 1A:
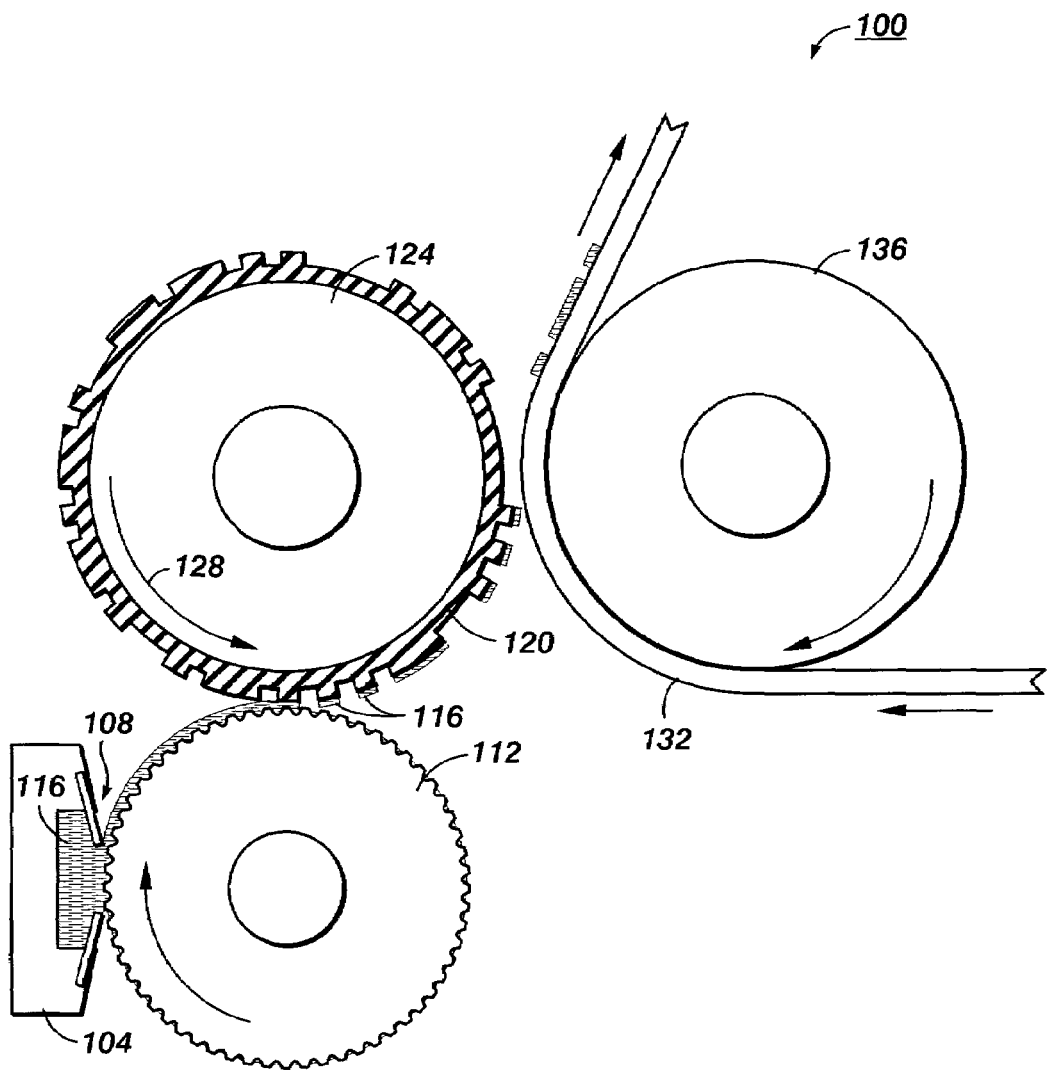
FIG. 1a shows an example Printing System suitable for flexographic printing.

An improved method and apparatus of forming and patterning a reusable printing plate for use in a relief or recess printing system is described. As used herein, a 'relief printing system' is broadly defined to be any image making apparatus that relies on a three dimensional pattern on a printing plate, the raised portions of the three dimensional relief pattern, are coated with a substance (typically ink) which is then transferred to a surface to be printed. As used herein, a "recess printing system" is broadly defined to be any image making apparatus that relies on a three dimensional relief pattern on a printing plate, the lowered portions of the three dimensional pattern are filled with a substance (typically ink) which is then transferred to a surface to be printed. As used herein, a "relief pattern" is broadly defined as any three dimensional pattern on the surface of a printing plate which can be used in either recess or relief printing systems.

FIG. 1 shows an example of a high speed flexographic relief printing system 100. In FIG. 1, an inking unit 104 including a chambered doctor blade unit 108 inks an anilox roller 112. The printing system 100 includes a flexible master print plate 120 wrapped around a plate cylinder 124. As plate cylinder 124 rotates in a direction indicated by arrow 128, the raised surface of flexible master print plate 120 picks up ink from anilox roller 112 and transfers the ink to a printed surface 132. The resulting pattern printed on printed surface 132 matches the raised pattern on the flexible master print plate. A hard impression cylinder 136 provides the rotating force that rotates printed surface 132 and the contact force needed for transfer of ink.

The relief pattern on the print plate 120 changes to print different images. In one embodiment, the relief pattern changes are made by actuating selected regions of the flexible surface. As used herein, actuating is broadly defined to be any raising or lowering of a selected region of the flexible surface.

Figure 1B:
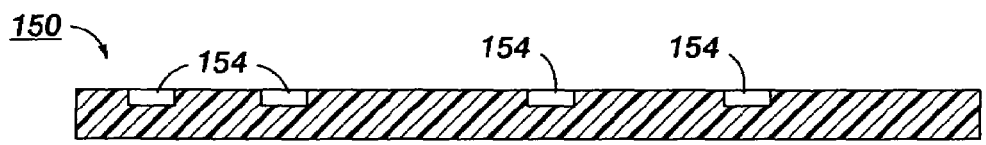
FIG. 1b-1e show example steps involved in Gravure (intaglio) printing
Figure 1C:
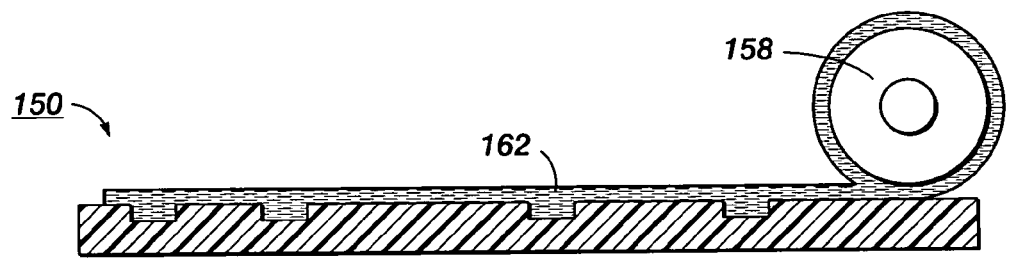
Figure 1D:
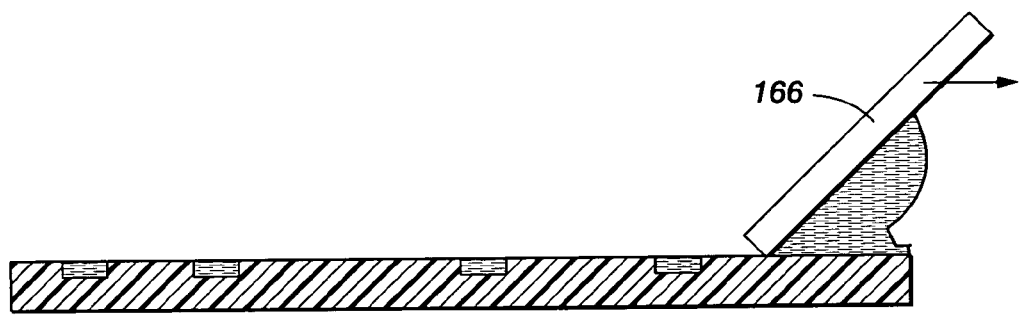
Figure 1E:
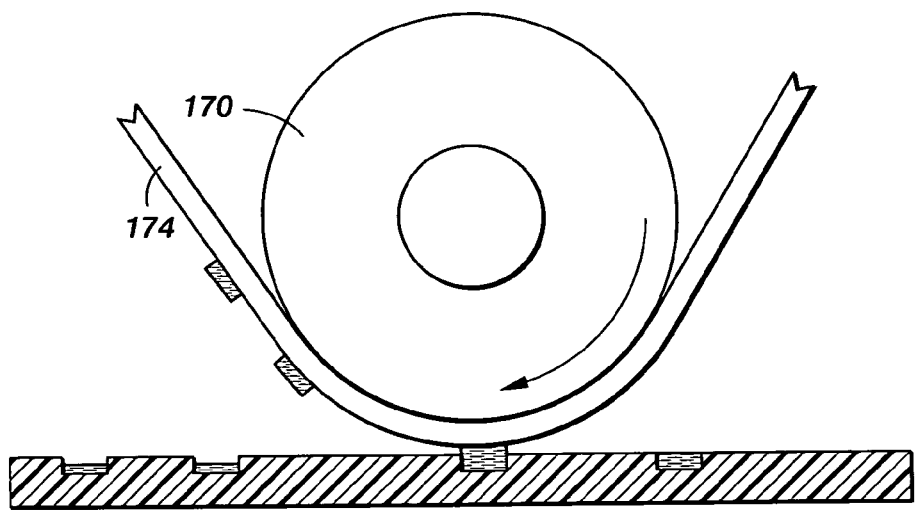

In an alternate embodiment, recessed printing may be used. FIGS. 1b-1e show a recessed printing process. In FIG. 1b, a printing plate 150 includes a plurality of recesses 154 for accepting ink. In FIG. 1c, an ink roller 158 deposits ink 162 across printing plate 150 filling in the recess 154. In FIG. 1d, a doctor blade 166 or other removal system is used to remove excess ink from the raised (or non lowered) areas. In FIG. 1e, a hard impression roller 170 presses a substrate to be printed, typically paper 174, into the printing plate 150. The paper 174 picks up ink from the recessed areas 154, thus creating an image on the paper that approximately matches the recessed portions of the relief pattern on the printing plate.

Various methods may be used to "actuate" (here broadly defined to mean raise or lower a region) regions of the printing plate used in either relief or recessed printing. One method of actuating print plate regions is by controlling a fluid flow underneath the flexible surface. "Fluid" as used herein is broadly defined to be any material in a gaseous or liquid state that flows. FIGS. 2-8 show using a plurality of microvalves to control fluid flow. FIGS. 9-13 show an alternative structure and method of using the electrorheological (ER) effect in a fluid to control fluid flow.

Figure 2:
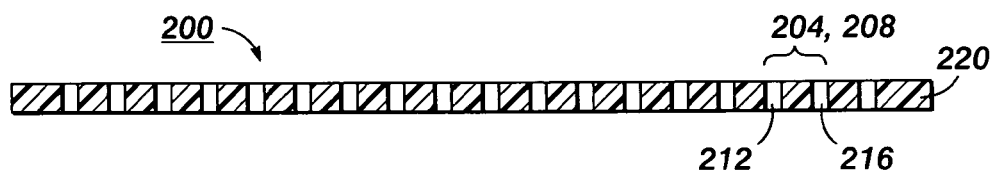
FIG. 2 shows a grid layer or pore membrane including a plurality of holes or microvalves.

FIG. 2 shows an intermediate layer, usually a grid layer 200 including an array of micro-valves 204, 208. Each microvalve controls fluid flow through a "flow path". As used herein, "flow path" is broadly defined as any path, channel, tunnel, hole or other feature in the gel material which permits fluid flow through. As used herein "grid layer" is broadly defined as a layer structure with a plurality of flow paths through the layer. The pattern of flow paths through the grid layer may be uniform, however that is not a requirement. In particular, the distribution of flow paths through a grid layer may be adjusted to be in the form of a uniform array or it may be distributed in other ordered or random arrangements or patterns. Each valve includes capillary holes 212, 216 (or pores) in a gel-like material 220 layer. The gel-like material has a high dielectric strength and a low modulus of elasticity in the range of 200 kPa to 100 MPa. An example of a suitable gel-like material is Dielectric Gel #3-4207 or Gel #3-4220 from Dow Corning of Midland, Mich.).

Figure 3:
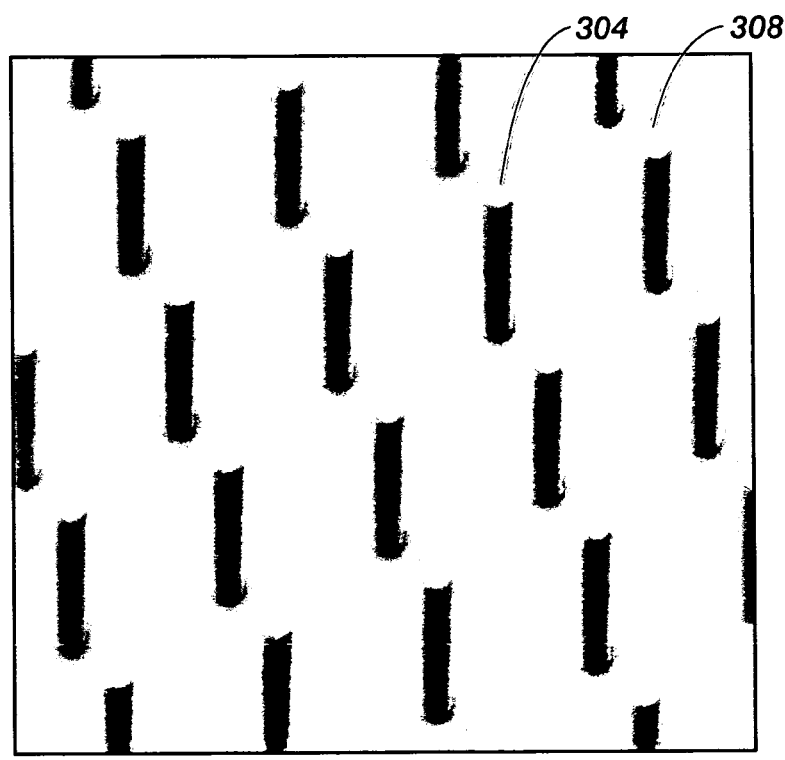
FIG. 3 shows an array of pillars that may be used to mold the plurality of holes in a gel structure.

Various methods may be used to form capillary holes 212, 216. One example method uses a mold to mold the gel-like material 220. FIG. 3 shows an example mold that includes an array of Su-8 photoresist pillars 304, 308. The pillars may be formed using soft lithography techniques. Each pillar typically has a diameter between 5-20 microns and a height of around 50-500 microns. The gel-like material is molded around the pillars such that upon demolding (separation of the gel material from the Su-8 photoresist), a plurality of holes remain in gel material 220.

Figure 4:
FIG. 4 shows forming a printing layer including a printing surface over the grid layer.

FIG. 4 shows a flexible printing layer 404 including a printing surface bonded over grid layer 200. Typically, printing layer 404 is a flexible, rubber like substance that attracts ink and resists fluid penetration. One example of a suitable printing layer 404 material is a very high bond elastomer such as VHB adhesive transfer tapes from 3M Corporation of St. Paul, Minn.

Figure 5A:
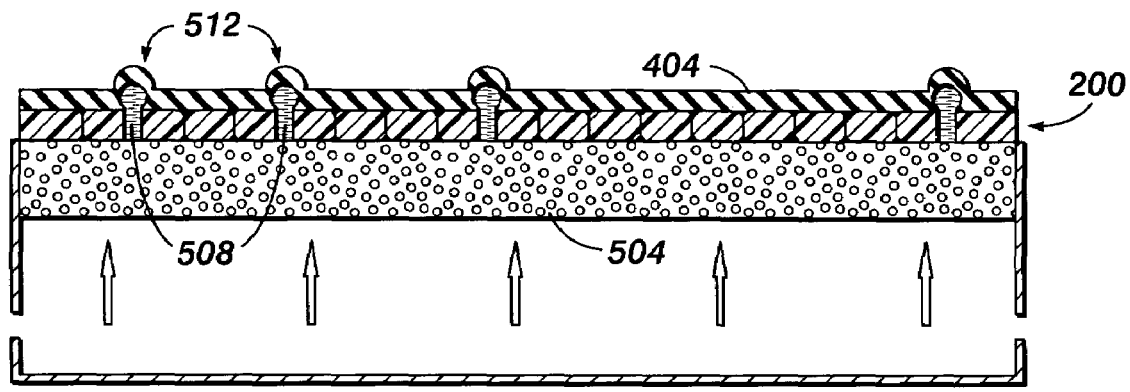
FIG. 5a shows a pressurized fluid creating a relief pattern in the printing surface through open holes by raising selected regions in the printing surface.
Figure 5B:
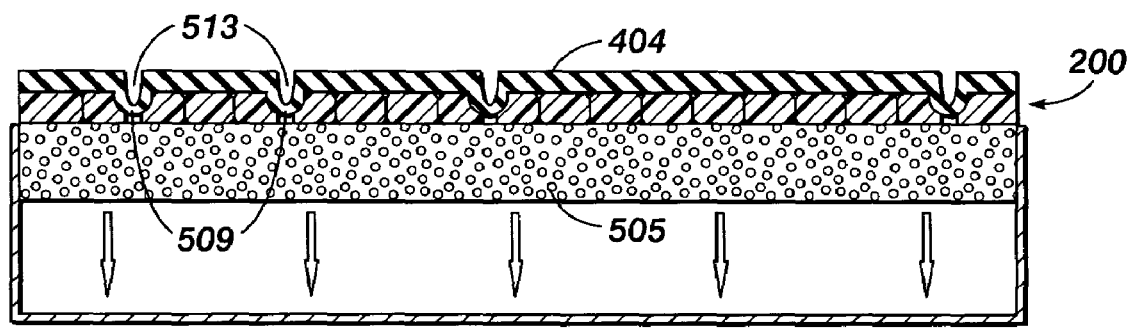
FIG. 5b shows a de-pressurized fluid creating a relief pattern in the printing surface through open holes by lowering selected regions in the printing surface.

FIGS. 5a and 5b show fluid layers 504, 505 underneath grid layer 200. FIG. 5a shows the embodiment used for relief printing and FIG. 5b shows a very similar structure adapted for recessed printing. Typically fluid layers 504, 505 contain an actuating fluid. Examples of actuating fluids include gases, such as air, or liquids such as an inert oil. Fluid layers 504, 505 may be a liquid or gas reservoir. In an alternate embodiment, fluid layers 504, 505 may include a porous or sponge like substrate that contains the actuating fluid.

Fluid flow through the microvalve flow paths or in the illustrated embodiment, holes actuates portions of printing layer 404. In FIG. 5a, open holes actuate printing layer 404 by raising corresponding regions 512 of the printing layer 404. In particular, the fluid in fluid layer 504 is typically at a higher pressure than atmospheric pressure. Thus after select holes are closed, the pressure is raised such that open hole such as hole 508 allows fluid to flow up through the hole and press against printing layer 404. The pressure should be sufficiently high to raise the corresponding region 512 of the printing layer.

In another embodiment as shown in FIG. 5b, open holes actuate printing layer 404 by lowering corresponding regions 513 of the printing layer. In FIG. 5b, after select holes are closed, pressure of fluid layer 505 is reduced to below atmospheric. The de-pressurized fluid flows through open holes 509 that are not electrostatically closed. This results in actuation of corresponding regions 513 of the printing layer to create a recessed image pattern on the printing surface. To ensure that the actuated image pattern continues to remain on the printing plate during inking and image transfer, a constant lower pressure than atmospheric pressure may be maintained on fluid in fluid layer 505. Alternately, a uniform charge may be applied that closes all the holes in the grid layer effectively trapping the fluid at lower pressure between the printing layer and the grid layer in the actuated region. Thus opening and closing microvalve holes controls printing surface actuation. Each grid layer 200 hole can be individually addressed using a charge pattern. One method of generating a charge pattern is using a photoreceptor and raster output scan (ROS) system as done in xerographic systems. In such systems a laser is used to discharge select portions of a charged plate. Such a system is described in U.S. Pat. Nos. 4,687,317, 5,019,837, 5,404, 202, which are hereby incorporated by reference. However, instead of attracting toner particles as is done in conventional Xerography systems, the charge pattern produces an electric field that closes microvalve holes. The hole aperture (amount of closing) corresponds to the electric field strength generated by the charges. Stronger electric fields produce smaller apertures.

Figure 6:
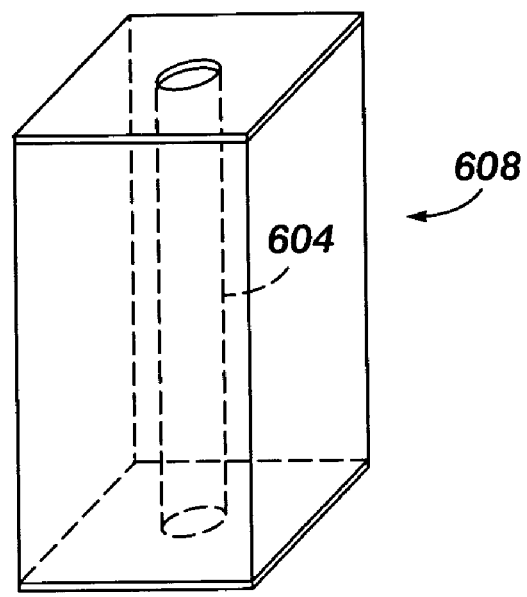
FIG. 6-7 show how the microvalve closes with the application of charge that applies resulting electrostatic forces to the gel material in the grid layer.
Figure 7:
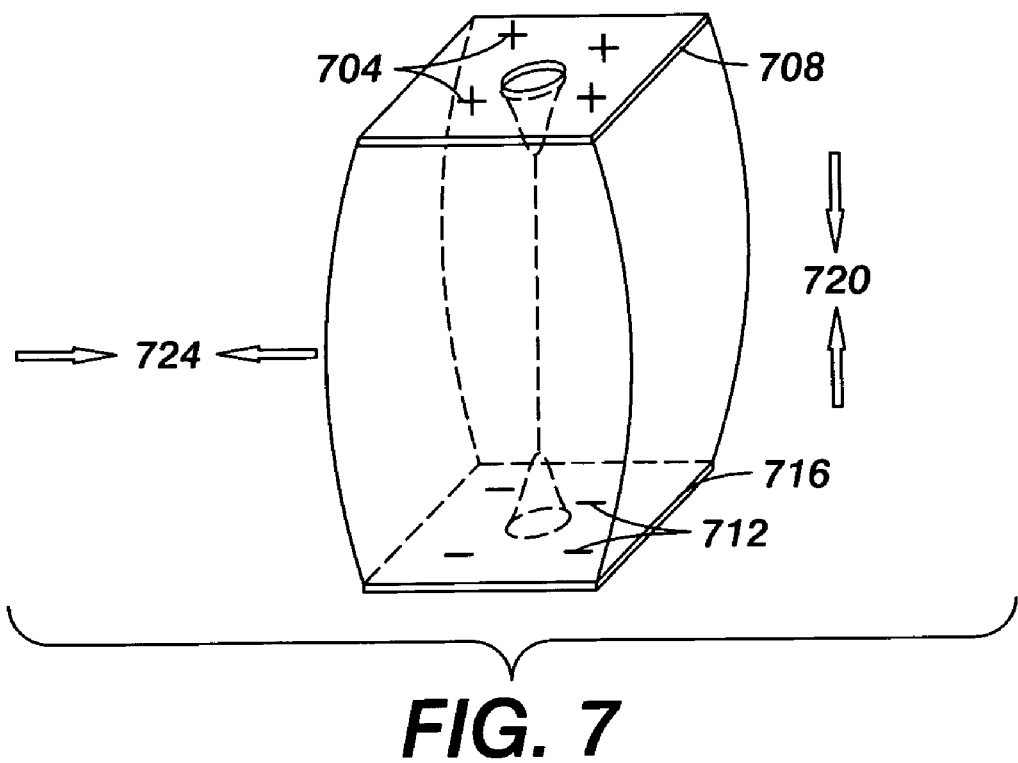

FIGS. 6 and 7 show a side cross sectional view of a microvalve being closed. FIG. 6 shows gel material 608 surrounding a flow path, in this case a hole column 604. Gel material 608 is typically a special class of encapsulant that cures to a soft material. Example gel hardness ranges between 50-500 g. Typical gel densities range between 0.9 and 1.22 g/cc. The gel has many of the stress relief and "self-healing" properties of a liquid while still providing the dimensional stability of an elastomer.

The gel itself may be made from a wide variety of materials, although silicone is a common material. Because opening and closing of the microvalve will involve high electric fields, the gel should have a high dielectric strength. In one embodiment, charges 704 and 712 of FIG. 7 result in 300-600 volts applied across the approximately 100-200 micron thick gel layer, thus the gel should not break down when subject to the resulting high electric fields. A low modulus of elasticity in the range of 200 kPa to 100 MPa helps the gel retain its shape in the absence of an electric field, but compresses the gel sufficiently to close an approximately 10-40 micron diameter hole column 604 when the electric field is applied. Examples of suitable dielectric gels include Dielectric Gel #3-4207 or Gel #3-4220 from Dow Corning of Midland, Mich.

Prior to fabrication, Dow Corning and other manufacturers typically provide the gel as a liquid which the end user assembles and "cures". In one embodiment, the gel is a two part liquid that is set or otherwise cured upon mixing to form the gel. In alternative forms, the gel may be fabricated from a single liquid that is the cured using heat or UV radiation. Curing may occur after the liquid is poured around a mold, such as the mold of FIG. 3 such that the resulting gel is shaped as desired.

In order to control the microvalve flow path opening and closing, FIG. 7 shows positive charges 704 deposited or closely positioned to a first side 708 of gel material 608 and negative charges 712 deposited on, or closely positioned to, an opposite side 716 of the gel material. The resulting electric field produces a compression force in a compressive force direction 720 on gel material 604. The compression force slightly reduces the distance between the entrance and exit openings of the hole column. In the process, the compressive force bows the hole sidewalls constricting or otherwise closing hole column 604.

In the illustrated embodiment, the force applied to the gel by the charge is in a force direction 720 parallel to hole column 604 sidewalls resulting in a bowing of the hole sidewalls in a direction 724 approximately perpendicular to force direction 720. Thus the force direction does not have a vector component that overlaps the direction of wall movement that causes the hole closing. In the illustrated example, the hole closing is caused entirely by compression induced dielectric gel spreading. However, when flow paths other then a perpendicular column are used, some components of force direction 720 may not be orthogonal to the sidewall movement in which case, the flow path closing may be caused by direct pressure from force direction 720.

Although FIG. 7 shows the charges deposited directly on the gel material, it should be understood that the charge may be applied to other surfaces. Those other surfaces may include printing layer 404. In alternate embodiments, flexible electrodes typically made of metal may be deposited near each entrance of each hole column 604 to facilitate charge deposition and accumulation near the gel entrances. When electrodes are used, the electrodes should be electrically isolated from adjacent electrodes to allow independent addressing, opening and closing, of each hole column (or group of hole columns when a "pixel" includes a group of hole columns). Regardless of how the charge is applied and maintained, the primary criteria is that the charges produce a localized net compressive force to the gel that constricts or closes the hole.

After the appropriate holes are closed, pressure is applied to fluid layer 504. The pressurized fluid flows through open holes 508 that are not electrostatically closed. The pressurized fluid actuates corresponding regions 512 of the printing layer to create a raised image pattern on the printing surface. To ensure that the actuated image pattern continues to remain on the printing plate during inking and image transfer, a constant pressure may be maintained on fluid in fluid layer 504. Alternately, a uniform charge may be applied that closes all the holes in the grid layer effectively trapping the fluid between the printing layer and the grid layer in the actuated region.

Figure 8:
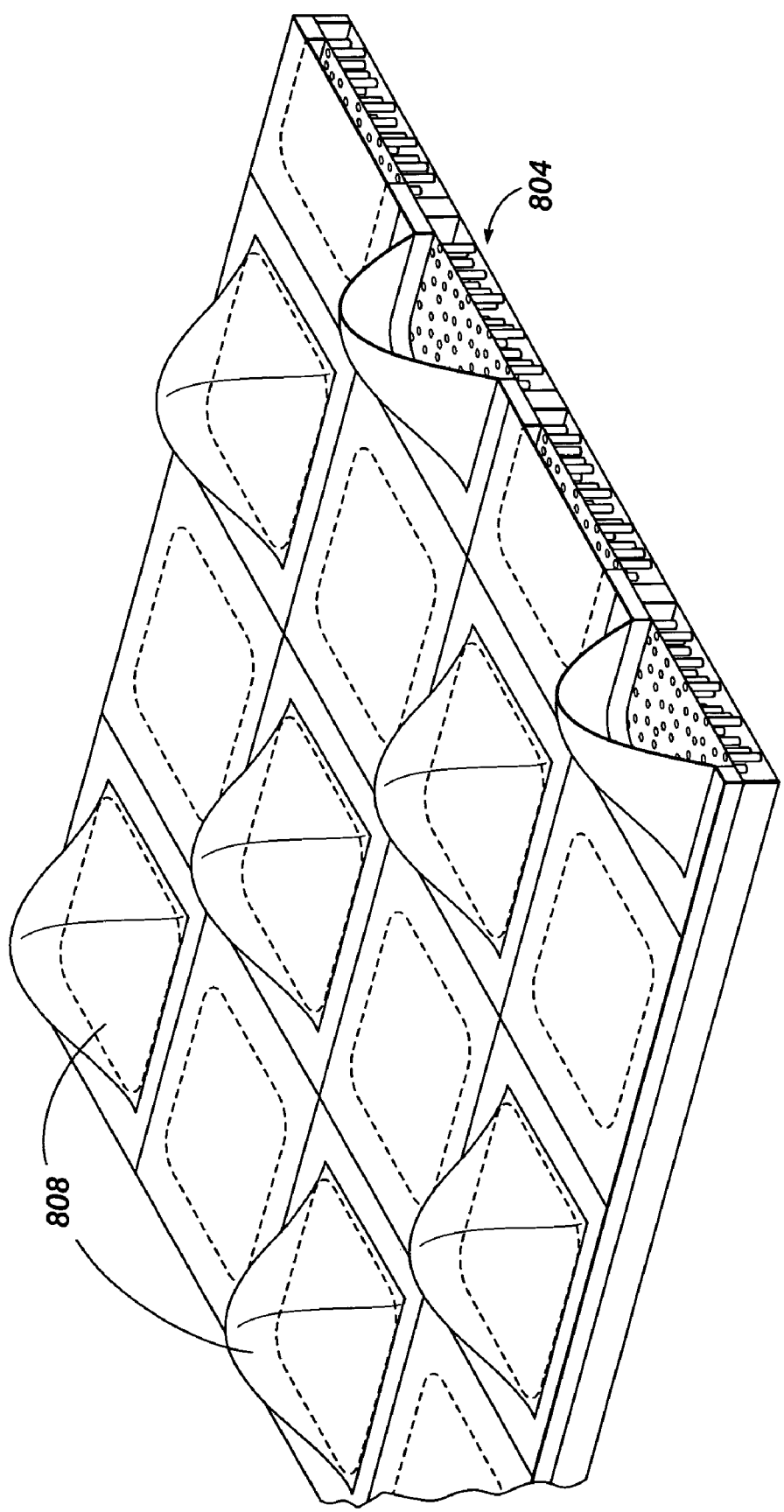
FIG. 8 shows a three dimensional relief surface after actuation.

Although FIGS. 5a and 5b show one bump or well (dimple) per grid hole implying a one pixel per grid hole correspondence, it should be understood that a pixel is not that limited. FIG. 8 shows one example of a two dimensional topography that results from allowing multiple holes 804 (or microvalves) to address each print element.

When a print run has been completed, the relief pattern may be "erased". In order to erase the relief pattern, the substrate may be discharged. One method of discharging the entire charged surface uses light such as is done in Xerography. Other methods include physical contact with a electrically conductive grounding plate that discharges the master plate Removing the charge removes the electric field across the gel layer. Without an electric field, the compressive force on the gel relaxes thereby reopening the holes (or microvalves). To erase the printing surface pattern by resetting the amount of fluid contained between the print surface and the gel 200 across all print pixels, the fluid pressure in fluid layer 504 or layer 505 is typically brought close to atmospheric pressure (or even slightly below atmospheric pressure creating a slight vacuum in the embodiments where bumps are formed as illustrated in FIG. 5a or slightly above atmospheric pressure where recesses are used in recessed printing as illustrated in FIG. 5b). Internal stresses in the elastomeric printing layer, possibly assisted by a slight pressure differential between the fluid layer and the external atmospheric pressure, forces fluid to reflow through the open holes thereby "erasing" the relief pattern. The printing plate can then receive a new charge distribution to produce a new relief pattern on the printing surface.

Although the prior description describes opening and closing holes or microvalves, the microvalves do not have to be completely opened or closed. In some embodiments, a "half toning" process is possible where the holes of the microvalve are only partially closed to create a "leaky microvalve". For example, if 600 volts is a "closing voltage" that completely closes a hole, a gray tone may be achieved by applying a voltage less than 600 volts. The lower voltage reduces the hole or aperture size but does not completely close the hole. The reduced hole size allows some fluid to leak through the grid hole thereby partially raising or lowering the printing surface. The slightly elevated or recessed printing plate surface attracts and deposits some ink on the printed surface, but not as much ink as fully raised or fully recessed regions of the printing surface which correspond to a fully open hole.

Figure 9:
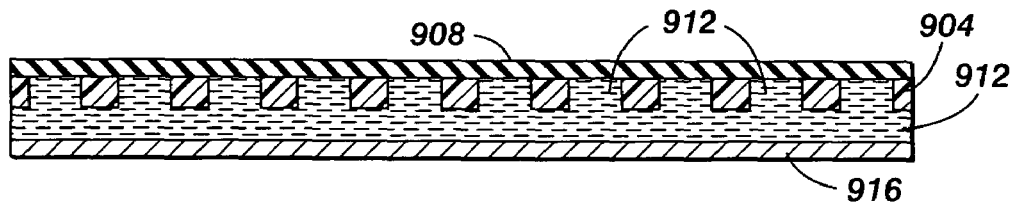
FIG. 9 shows a printing master plate that utilizes an electrorheological fluid.

FIGS. 9-13 show an alternate embodiment of the invention that uses an electrorheological fluid to raise and lower portions of a flexible relief printing surface. FIG. 9 shows a grid layer such as a mesh 904. One example of such a mesh is a Stork mesh made by Stork Prints Corporation of Charlotte, N.C. Over the mesh layer, a flexible printing layer 908 is deposited. Printing layer 908 is typically a flexible rubber like substance that adheres to ink and resists fluid penetration. One example of a suitable printing layer 908 is a very high bond elastomer such as VHB adhesive transfer tapes from 3M Corporation of St. Paul, Minn.

Underneath the mesh or grid layer 904 is a layer of electrorheological fluid (hereinafter ER fluid) 912. ER fluids are special classes of fluids in which the apparent viscosity and yield stress can be increased by applying an external electrical field. As used herein, "apparent viscosity" will be defined as the change in state of an ER fluid upon application of an electric field. The ER fluid is believed to undergo a change in an electric field resulting in an increase in its shear yield stress. A detailed description of ER fluids is provided in 'Electrorheological Fluids' by Tian Hao, Advanced Materials 2001, vol. 13, no. 24, page 1847 which is hereby incorporated by reference.

In one embodiment, the ER fluid includes insulated iron particle suspensions in an insulating liquid. Upon application of an electric field, the particles align in the field direction to produce fluid thickening (an increase in viscosity). One example of such a fluid is a fluid that contains 15% by weight of insulated iron particles suspended in an Isopar-V mineral oil. One example of appropriate particles are 2-4 micrometer diameter insulated iron particles such as Carbonyl Iron Powder coated with a phosphate/$SiO_2$. Such coated Carbonyl Iron Powder is commercially available as CIP-EW-I from BASF Corporation of Ludwigshafen, Germany. Several other types of Electrorheological fluids may also be used in this embodiment, including but not limited to suspensions of any non-conducting or electrically insulated particulates dispersed in an insulating liquid. Other utilizable Electrorheological fluids include fluids where one liquid phase is dispersed inside another fluid phase to create an emulsion.

Various methods are available for applying an electrical field to the ER fluid and thereby controlling the fluid viscosity/yield stress. One method of applying such a voltage is to apply the voltage directly to the printing surface. Although applying charge directly over the printing surface layer simplifies master plate construction, high voltages are needed to generate the electric field in the ER fluid layer due to the distance between the ER fluid layer and the top of the printing layer. Additionally, careful consideration should be given to prevent ink deposited over the print layer during printing from discharging the charge.

Figure 10:
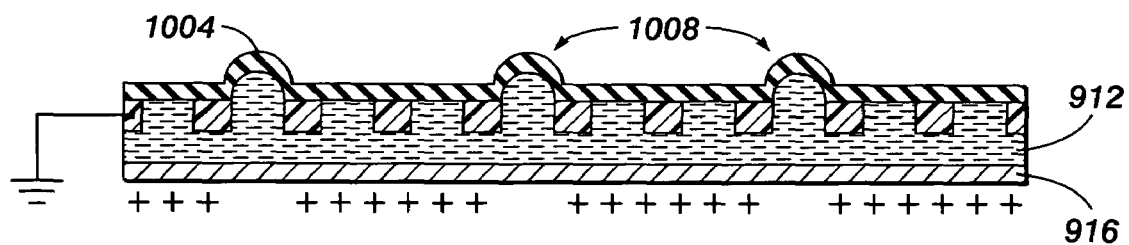
FIG. 10 shows the application of an electrical charge pattern to an electrode layer in the ER fluid printing master plate to produce a relief pattern on the printing surface upon pressurization of the ER fluid.

A second method of applying an electric field to the ER fluid is by applying charge to a backing electrode 916. FIG. 10 shows applying a charge to backing electrode 916 and electrically grounding the grid layer 904 to create an electric field across the ER Fluid 912. Portions of the Electrorheological fluid exposed to high electric fields become very viscous and have a high yield stress. As the ER fluid flows along the fluid layer and is pressurized the highly viscous areas of the fluid limits fluid flow through the holes in grid layer 904. However in regions with a low electric field, the fluid viscosity is low and the fluid pressure is easily transferred to the printing layer 908. Thus bumps or elevated relief portions 1004, 1008 of printing layer 908 form in the low electric field/low viscosity areas.

Figure 13:
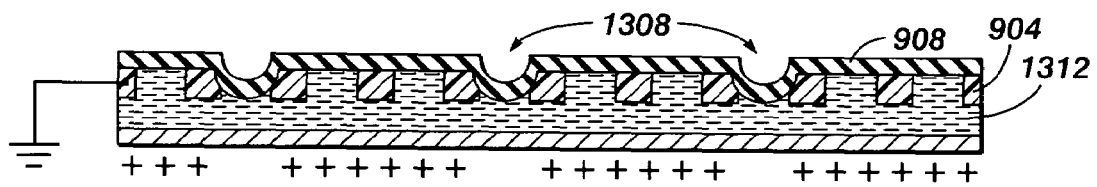
FIG. 13 shows the application of an electrical charge pattern to an electrode layer in the ER fluid printing master plate to produce a relief pattern on the printing surface upon de-pressurization of the ER fluid.

In another embodiment as illustrated in FIG. 13, the ER fluid is de-pressurized (its pressure is adjusted to below atmospheric pressure). Highly viscous areas of the fluid limits fluid flow through the holes in grid layer 904. However in regions with a low electric field, the fluid viscosity is low and the fluid is easily transferred away from under the printing layer 908 upon de-pressurization. Thus wells or recessed portions 1304, 1308 of printing layer 908 form in the low electric field/low viscosity areas.

Other means of positioning charge to generate an electric field either in the holes or in close proximity near the holes are also possible. For example, a porous electrode may be used directly beneath the grid layer. The porous electrode would allow fluid flow and the close proximity to the hole entrances would allow low voltages to be used.

In practice, it has been found that in the absence of an electric field, when an actuation pressures of around 35 psig (2.4 atms) was applied to an ER fluid, the fluid flowed through approximately 150 micron diameter grid holes, and produced 75-85 micron bumps on a 40 micron thick 3M-VHB elastomer. In regions where a raised printing surface was undesirable, 600 to 800 volts applied across a 0.5 mm gap of ER fluid generated an electric field sufficient to prevent substantial bump formation. Although these are example values, it should be noted that other values may be used. Typically the grid holes should be large enough to allow flow of the ER fluid in a low viscosity state but small enough to resist ER fluid flow when the ER fluid is in a high viscosity state. Typical hole size ranges are between 5 microns and 250 microns.

After raising or lowering select areas of the printing surface to create a relief pattern, the relief needs to be maintained throughout during printing. One method of maintaining the relief pattern is to maintain throughout printing the electric field distribution and the pressure on the ER fluid initially used to create the relief pattern. An alternate method is to "immobilize" ER fluid by applying a high uniform electric field across all the ER fluid in the printing plate. As used herein "immobilize" means that the yield stress is substantially increased, typically beyond a value of 4 kPa, such that fluid flow of the ER fluid, particularly through the hole directly above the immobilized fluid is substantially impeded.

Figure 11:
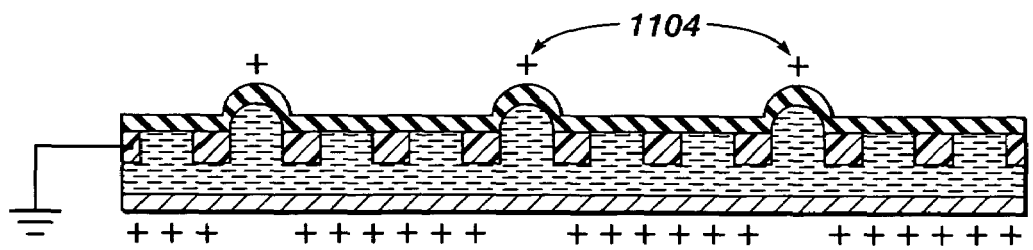
FIG. 11 shows applying additional charge to the ER fluid printing master plate to "freeze" the relief pattern for use in printing.
Figure 12:
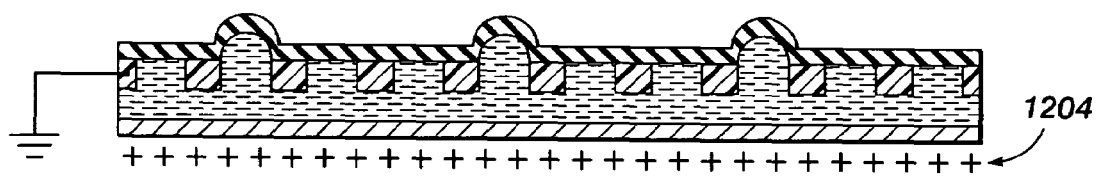
FIG. 12 shows applying uniform charge to the bottom electrode under the ER fluid layer to "freeze" the relief pattern for use in printing.

FIG. 11 shows adding charge near the vicinity of the raised relief regions to "immobilize" the ER fluid. Although FIG. 11 shows adding charge to the top layer near the raised relief region, it should be understood that other charge distributions are possible. For example, FIG. 12 shows placing charge across the entire backing electrode to produce an electric field that renders all ER fluid highly viscous thereby immobilizing the ER fluid. The high viscosity prevents internal elastomer stress release because the force applied by the elastomer layer is insufficient to push the highly viscous ER fluid through the grid holes. Thus the pattern may be maintained even in the event the ER fluid pressure is reset to values close to atmospheric pressure levels.

As in the case of the microvalve controlled print surfaces of FIGS. 4-7, half-toning may be achieved in the ER fluid embodiments by applying a weak electric field. A weak electric field increases viscosity but not to the point that it immobilizes the ER fluid. In regions with a more viscous but not immobilized fluid, relief pattern is formed but to less then the full height. Thus, when the inked printing surface is pressed against a surface being printed, less ink (effectively a gray scale) is transferred by the partially raised but not fully raised bump (or partially recessed but not fully recessed well in case of recess printing).

Both microvalves or ER fluid controlled relief patterns differ from traditional relief patterns in that the relief pattern created is pixelated. In particular, the relief pattern is made up of "bumps" or "wells" such as bump region 512 of FIG. 5a, bump 808 of FIG. 8, elevated relief portion 1004 of FIG. 10, and wells 513, 1304 and 1308 in FIGS. 5b and 13. An array of such bumps or wells makes up a relief surface, thus the relief area may not be as smooth as relief areas created using other technologies such as conventional flexography where continuous raised reliefs are possible. The uneven raised relief surface can create problems when printing large uniform areas.

In order to compensate, for uneven large print areas, various techniques may be used during printing to "smooth out" the printed product. In one embodiment using raised bumps for relief printing, additional pressure is applied to the print area during printing. The increased pressure deforms the highest portion of each raised bump during ink transfer to assure that slightly lower areas also transfer sufficient ink to create a uniform printed surface. Increased pressure during image transfer may also be used to reflow paper or the other material receiving the printed image to ensure uniform ink coverage. Finally, uniform ink coverage may be enhanced by pressure alterations or "back and forth" rocking motions of the relief surface or the substrate receiving an ink impression from the relief surface in either relief or recess printing using bumps or wells.

The relief surface, in particular the master printing plate created by either the microvalve structures or the electrorheological fluid may be used in a variety of printing systems. One particularly suitable use is in the flexographic printing system of FIG. 1a or the Gravure printing process of FIG. 1b. In the systems, ink deposition on the printing surface may occur before actuation of the relief layer, although more typically, the ink deposition occurs after the relief pattern has been formed in the printing surface.

The inked printing surface is subsequently pressed into a surface to be printed. After printing the desired number of copies, the relief surface is "relaxed" or "erased" such that the printing surface becomes approximately planar. In both the microvalves embodiment as well as the ER embodiment, relaxation occurs by removing the electric field. In the illustrated microvalve case, electric field removal opens the microvalves. In an ER fluid case, electric field removal decreases the ER fluid viscosity. In the case of raising selected regions of the printing plate to create the relief surface by increasing the pressure of the fluid layer, subsequent fluid pressure reduction, typically to at or below atmospheric pressure allows the elastic printing surface to release stress and force the fluid back through the open hole in the grid. Forcing fluid out from the space between the grid layer and the printing surface layer results in an approximately planar printing surface. The erased printing surface is then ready to receive the next relief pattern for the next printing cycle.

Likewise, in the case of recessed printing based on reduced fluid pressures, erasing may be achieved by fluid pressure increases to at or slightly above atmospheric pressure. The increased fluid pressure allows the elastic printing surface to release stress and draw the fluid back under the flexible printing layer through the open flow paths or holes. Filling the holes results in an approximately planar printing surface. The erased printing surface is then ready to receive the next relief pattern for the next printing cycle.

The preceding description includes many details. These details are included in order to provide examples and thereby facilitate understanding of the invention. The description details are not intended, and should not be interpreted to limit the scope of the invention. Instead, the invention should only be limited by the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of using a microvalve comprising:
    pushing a fluid through a flow path, the flow path having walls made from a gel material, the flow path having a first opening and a second opening, the gel material consisting essentially of a dielectric gel;
    applying a first electrical charge of a first polarity near the first opening and a second electrical charge of a second polarity near the second opening such that attraction between the applied charges generates an electric field across the gel material disposed between the first and second openings, thereby producing a compressive force to the gel material that reduces the distance between the first opening and the second opening, the compressive force causing bowing of the walls of the flow path thereby closing the flow path and preventing fluid flow through the flow path.

2. The method of claim 1 wherein the flow path is an approximately cylindrical hole through the gel material.

3. The method of claim 2 wherein a direction of the compressive force is approximately perpendicular to the movement of the flow path walls.

4. The method of claim 1 wherein the voltage applied is between 50 volts and 1000 volts across a dielectric gel having a thickness between 10 microns and 1000 microns.

5. The method of claim 1 wherein the flow path is a hole through a layer of the gel material.

6. The method of claim 1 wherein the electrical charge is applied directly to the gel material.

7. The method of claim 1 further comprising the operations of:
    removing the applied charges thereby removing the compressive force, the flow path reopening and allowing fluid flow after the charges are removed.

8. A microvalve structure comprising:
    a gel material layer having a flow path formed through the gel material layer, the gel material consisting essentially of a dielectric material;
    a positive charge distributed on a first side of the gel material layer;
    a negative charge distributed on a second side of the gel material layer, the positive charge and the negative charge being applied such that an electric field is generated across the gel material disposed between the first and second openings, thereby producing a compressive force on the gel material layer to cause bowing of the flow path walls closing the flow path to fluid flow.

9. The microvalve of claim 8 wherein removal of sufficient charge to remove the compressive force results in opening of the flow path to fluid flow.

10. The microvalve of claim 8 wherein the flow path is a hole through the gel material layer.

11. The microvalve structure of claim 8 wherein the gel material layer includes a plurality of flow paths.

12. The microvalve structure of claim 8 wherein the positive charge and the negative charge are applied directly to the gel material.

13. The microvalve structure of claim 8 wherein the voltage potential difference created by the positive charge and the negative charge is between 50 volts and 1000 volts and the gel material layer thickness is between 10 microns and 1000 microns.

* * * * *